US007369664B2

(12) United States Patent
Kargus, IV et al.

(10) Patent No.: US 7,369,664 B2
(45) Date of Patent: May 6, 2008

(54) HANDS-FREE MICROPHONE WITH WIND GUARD

(75) Inventors: Walter A. Kargus, IV, Livonia, MI (US); Kevin T. Moss, Detroit, MI (US)

(73) Assignee: General Motors Corporation, Detroit, MI (US)

( * ) Notice: Subject to any disclaimer, the term of this patent is extended or adjusted under 35 U.S.C. 154(b) by 582 days.

(21) Appl. No.: 10/893,478

(22) Filed: Jul. 16, 2004

(65) Prior Publication Data

US 2006/0013425 A1 Jan. 19, 2006

(51) Int. Cl.
*H04B 1/00* (2006.01)
*H04R 9/08* (2006.01)

(52) U.S. Cl. ......................... 381/86; 381/359; 381/365

(58) Field of Classification Search ................. 381/86, 381/359, 364, 365, 372; 181/205
See application file for complete search history.

(56) References Cited

U.S. PATENT DOCUMENTS 6,411,709 B1 * 6/2002 Lucey ........................ 381/364
6,614,911 B1 * 9/2003 Watson et al. .............. 381/359
6,935,458 B2 * 8/2005 Owens ....................... 181/205

OTHER PUBLICATIONS

AKG Acoustics, A Harman International Company, Q500 Series, Q501T WS, Amplified Version With Improved Wind Screen, V2.1 May 2004.

* cited by examiner

*Primary Examiner*—Brian Ensey

(57) ABSTRACT

An airflow guard for a microphone includes a shell having an airflow diverter and a flow separation edge. The airflow diverter partially surrounds the microphone to redirect a flow of air away from the microphone. The flow of air separates from one of the airflow diverter or the flow separation edge. An acoustic reception system for a mobile vehicle and a hands-free communication device are also disclosed.

13 Claims, 4 Drawing Sheets

HANDS-FREE MICROPHONE WITH WIND GUARD

FIELD OF THE INVENTION

This invention relates generally to microphonic transducer systems, and more specifically to wind guards for hands-free microphones in mobile vehicles.

BACKGROUND OF THE INVENTION

Automobile manufacturers and designers have focused on airflow smoothening and efficient sound-insulating methods for reducing noise in the vehicle cabin. Noise sources such as the wind, turbulence, and pressure fluctuations can excite the vehicle body and transmit noise into the car cabin. Other inherent noises of the automotive environment include tire and engine noise, as well as voices of other passengers. Fans and blowers of the heating, ventilation, and air conditioning systems generate noise and also generate local pressure variations in the forced air stream.

Besides being interested in finding ways to reduce the generation of turbulence, automotive manufacturers recognize the need to reduce the influence of the air pressure fluctuations inside a vehicle cabin upon various audio components such as a microphone of an in-vehicle cellular phone or a voice-recognition system.

Some of the newer automobile microphone systems use electronic processing, multiple microphones, or both to reduce the influence of the pressure fluctuations. These microphones can be located on rear-view mirrors, headliners, or steering columns.

In one example, an in-vehicle microphone system located in an overhead console picks up the driver's voice and uses algorithms in its electronic processing to cancel an "echo effect" and reduce background noise. This electronic processing helps improve the transmission quality of the driver's speech.

In another example, a self-contained digital-signal-processing (DSP) microphone system uses a digital microphone array and software algorithms to help reduce voice recognition and audio intelligibility issues common in high noise, automotive environments.

Microphone systems for vehicles would be improved if the influence of airflow within the cabin was reduced and the system did not require multiple microphones or signal-processing software to electronically reduce the influence of pressure fluctuations produced by in-vehicle airflow, thereby increasing the signal-to-noise ratio and improving the fidelity of the microphonic pickups to improve clarity of speech. Therefore, an improved in-vehicle microphone system provides clearer voice recognition, increases speaker intelligibility, enhances other noise reduction techniques, and reduces packaging complexity, circuitry and costs, while minimizing the influence of airflow around the vehicle cabin.

SUMMARY OF THE INVENTION

One aspect of the present invention is an airflow guard for a microphone. The airflow guard includes a shell having an airflow diverter and a flow separation edge. The airflow diverter partially surrounds the microphone to redirect a flow of air away from the microphone. The flow of air separates from the airflow diverter or the flow separation edge.

Another aspect of the present invention is an acoustic reception system for a mobile vehicle. The system includes a microphone connected to an in-vehicle communication device. The system includes a shell having an airflow diverter and a flow separation edge. The airflow diverter partially surrounds the microphone to redirect a flow of air away from the microphone. The flow of air separates from one of the airflow diverter or the flow separation edge.

Another aspect of the present invention is a hands-free communication device including a headset having at least one earphone and a microphone. The device includes a shell having an airflow diverter and a flow separation edge. The airflow diverter partially surrounds the microphone to redirect a flow of air away from the microphone. The flow of air separates from the airflow diverter or the flow separation edge.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
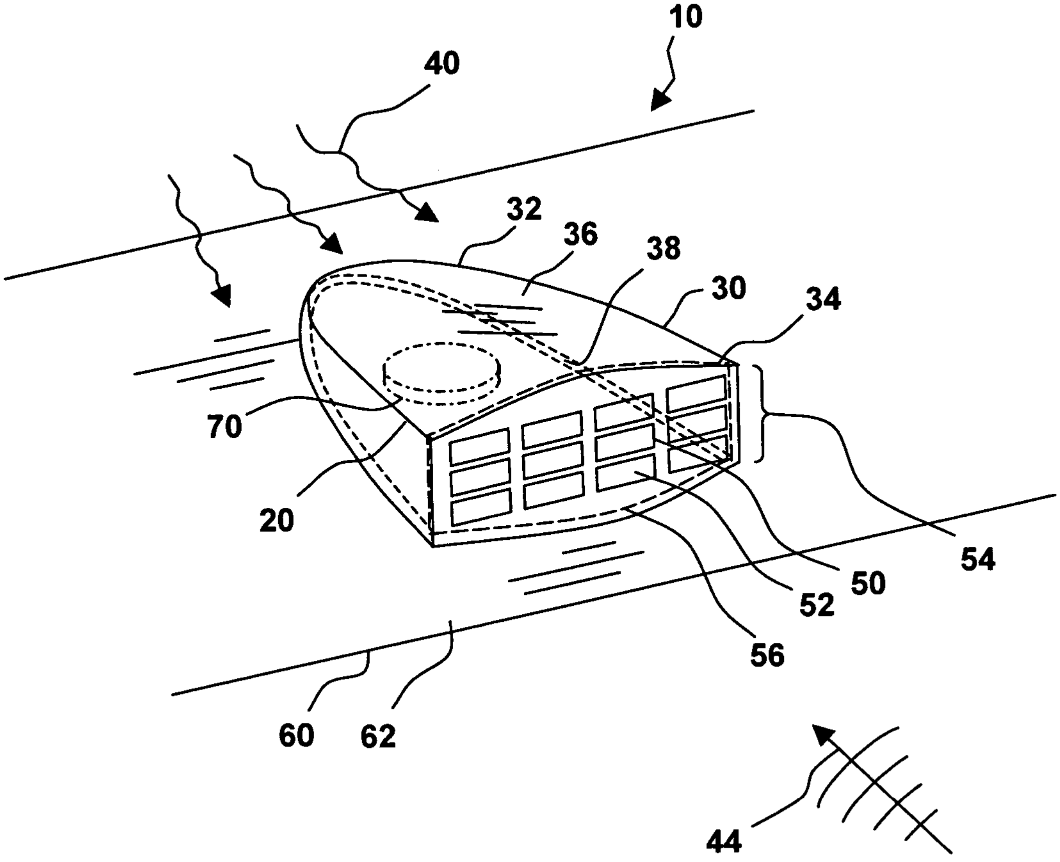
FIG. 1 illustrates an airflow guard for a microphone, in accordance with one embodiment of the current invention.

FIG. 1 illustrates an airflow guard for a microphone, in accordance with one embodiment of the present invention. An acoustic reception system 10 includes an airflow guard 20 for a microphone 70 that has a shell 30 with an airflow diverter 32 and a flow separation edge 34. Airflow diverter 32 partially surrounds microphone 70 to redirect a flow of air 40 away from microphone 70. Flow of air 40 may be mechanically or naturally generated, such as from a blower fan from a defroster in an automobile, a heating, ventilation and air conditioning system, an open window of a moving vehicle, or an open roof of a convertible. Flow of air 40 separates from airflow diverter 32 or flow separation edge 34 to minimize pressure fluctuations experienced by the microphone. Pressure fluctuations or density variations travel with the flow of air 40 and can interact with microphone 70 to generate undue noise that can swamp or diminish acoustic signals from, for example, a user's voice.

Airflow diverter 32 includes a contoured outer surface 36 to redirect flow of air 40 away from microphone 70. Contoured outer surface 36 may have a variety of shapes such as a cone shape, a half-cone shape, a wedge shape, a tapered rectangular shape, or an arched shape. Shell 30 comprises, for example, a relatively hard material with no perforations, openings or apertures prior to flow separation edge 34. The material of shell 30 may be textured or smooth. Flow separation edge 34 is positioned downstream of airflow diverter 32. Flow separation edge 34 has one or more sides and can be straight or curved along the edge border, with a relatively abrupt edge to incur changes in flow of air 40 as flow of air 40 transits past the edge border. Flow separation edge 34 can form a line of flow separation that generates recirculating flow near an acoustic entry port 50 of airflow guard 20. At flow separation edge 34, flow of air 40 with incumbent pressure fluctuations may minimally transition into recirculating flow to reduce the level and effect of the pressure fluctuations. Pressure fluctuations experienced by microphone 70 from flow of air 40 are minimized. In addition, flow separation edge 34, in one embodiment, extends beyond the acoustic entry point 50.

Airflow guard 20 includes an acoustic entry port 50 at least partially bordered by flow separation edge 34. Acoustic entry port 50 is positioned downstream of flow of air 40 and allows entry of acoustic sound 44 into microphone 70. Acoustic entry port 50 may include one or more apertures 52 to allow propagation of acoustic sound 44 while providing mechanical protection for microphone 70. A removable or permanently configured microphone grille 54 may be positioned in acoustic entry port 50. To further reduce the impact of pressure fluctuations from the recirculating flow, acoustic foam 56 such as open-cell foam or other suitable damping material may be positioned within shell 30 to further isolate microphone 70.

Shell 30 may have a mating surface 38 for positioning airflow guard 20 adjacent to a vehicle surface 62 of a vehicle 60. For example, shell 30 and microphone 70 may be positioned on a dash, console, steering wheel, or rearview mirror of vehicle 60. Shell 30 and microphone 70 may be inset, flush with, or protrude from vehicle surface 62. One or more airflow guards 20 and microphones 70 may be positioned within vehicle 60 to aid, for example, in hands-free communication using a cell phone, an in-vehicle telematics unit with advisor services, an in-vehicle entertainment system, or an in-vehicle voice recognition system.

Figure 2:
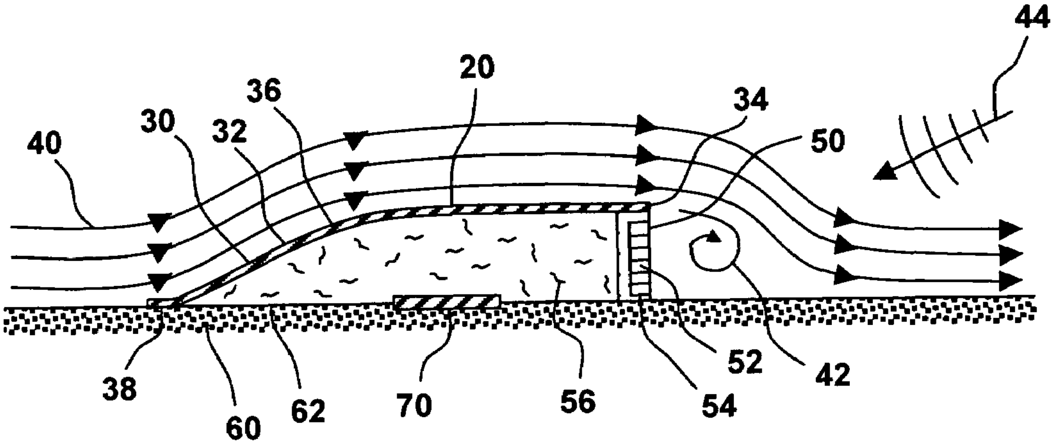
FIG. 2 shows a cross-sectional view of airflow over an airflow guard for a microphone, in accordance with one embodiment of the current invention.

FIG. 2 shows a cross-sectional view of airflow over an airflow guard for a microphone, in accordance with one embodiment of the present invention. Like-numbered elements correspond to similar elements in the previous and following figures. Airflow guard 20 for a microphone 70 includes a shell 30 having an airflow diverter 32 and a flow separation edge 34. Airflow diverter 32 with a contoured outer surface 36 partially surrounds microphone 70 to redirect a flow of air 40 away from microphone 70. Flow separation edge 34 is positioned downstream of airflow diverter 32. Depending on flow velocity and other factors, flow of air 40 transiting a front end of shell 30 may separate from airflow diverter 32 at points somewhere across outer surface 36. Alternatively, flow separation may occur at flow separation edge 34 if separation has not occurred earlier. Flow separation can create small amounts of turbulence and can generate vortices and other flow patterns that can break up and diminish the effect of pressure fluctuations in flow of air 40. Pressure fluctuations experienced by microphone 70 are thereby minimized. For example, flow separation edge 34 generates recirculating flow 42 near an acoustic entry port 50 of airflow guard 20 to reduce the level of pressure fluctuations in front of microphone 70.

Airflow guard 20 includes an acoustic entry port 50 at least partially bordered by flow separation edge 34. Acoustic entry port 50 is positioned downstream of flow of air 40. Acoustic entry port 50 allows entry of acoustic sound 44 into microphone 70. Acoustic entry port 50 may include one or more apertures 52 or a microphone grille 54 positioned in acoustic entry port 50.

To further decrease the effect of pressure fluctuations, acoustic foam 56 may be positioned within shell 30 to further isolate microphone 70.

Shell 30 may have a mating surface 38 for positioning airflow guard 20 adjacent to, for example, a vehicle surface 62 of a vehicle 60.

Figure 3:
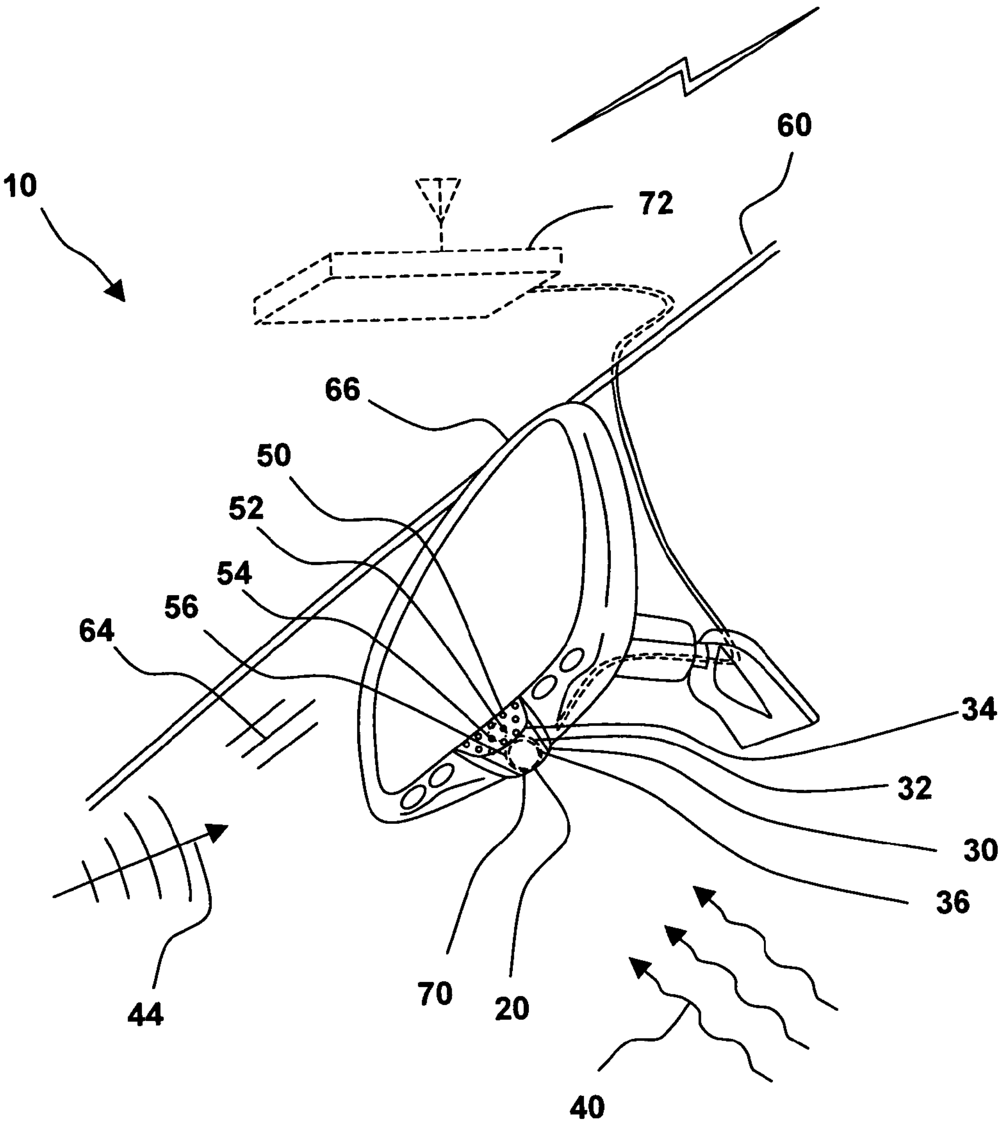
FIG. 3 illustrates an acoustic reception system for a mobile vehicle, in accordance with one embodiment of the current invention.

FIG. 3 illustrates an acoustic reception system for a mobile vehicle, in accordance with one embodiment of the present invention. Acoustic reception system 10 for a mobile vehicle 60 includes a microphone 70 with an airflow guard 20 connected to an in-vehicle communication device 72. As illustrated, airflow guard 20 and microphone 70 are positioned in a rearview mirror attached to a windshield 64 of vehicle 60. Microphone 70 is electrically connected to in-vehicle communication device 72 through, for example, a cable, a wire harness, an in-vehicle network, or a vehicle bus. Examples of in-vehicle communication devices 72 include a cell phone, a telematics unit, an entertainment system, and a voice-recognition system. Although shown connected to rearview mirror 66, one or more microphones 70 with airflow guards 20 may be connected to a steering wheel, a steering column, a dash, an entertainment console, an overhead console, a vehicle ceiling, or other in-vehicle locations.

A flow of air 40 such as from a defroster may impinge upon microphone 70. A shell 30 with an airflow diverter 32 and a flow separation edge 34 partially surrounds microphone 70 to redirect flow of air 40 away from microphone 70. Airflow diverter 32 may include a contoured outer surface 36 to redirect flow of air 40. Flow separation edge 34 is positioned downstream of airflow diverter 32. Flow of air 40 may separate either from points on outer surface 36 of airflow diverter 32 or at flow separation edge 34 to minimize pressure fluctuations experienced by microphone 70. For example, flow separation edge 34 generates recirculating flow near an acoustic entry port 50 of airflow guard 20 to reduce the level of pressure fluctuations in front of microphone 70.

System 10 includes an acoustic entry port 50 at least partially bordered by flow separation edge 34. Acoustic entry port 50 is positioned downstream of flow of air 40 and allows entry of acoustic sound 44 into microphone 70. Acoustic entry port 50 may include one or more apertures 52. Acoustic sound 44 generated, for example, from a driver or a passenger in vehicle 60 is detected by microphone 70 with increased clarity due to diminished pressure fluctuation effects from flow of air 40. Further reductions in pressure fluctuation effects may be achieved with a microphone grille 54 positioned in acoustic entry port 50, or with acoustic foam 56 such as open-cell foam positioned within shell 30 to isolate microphone 70.

Figure 4:
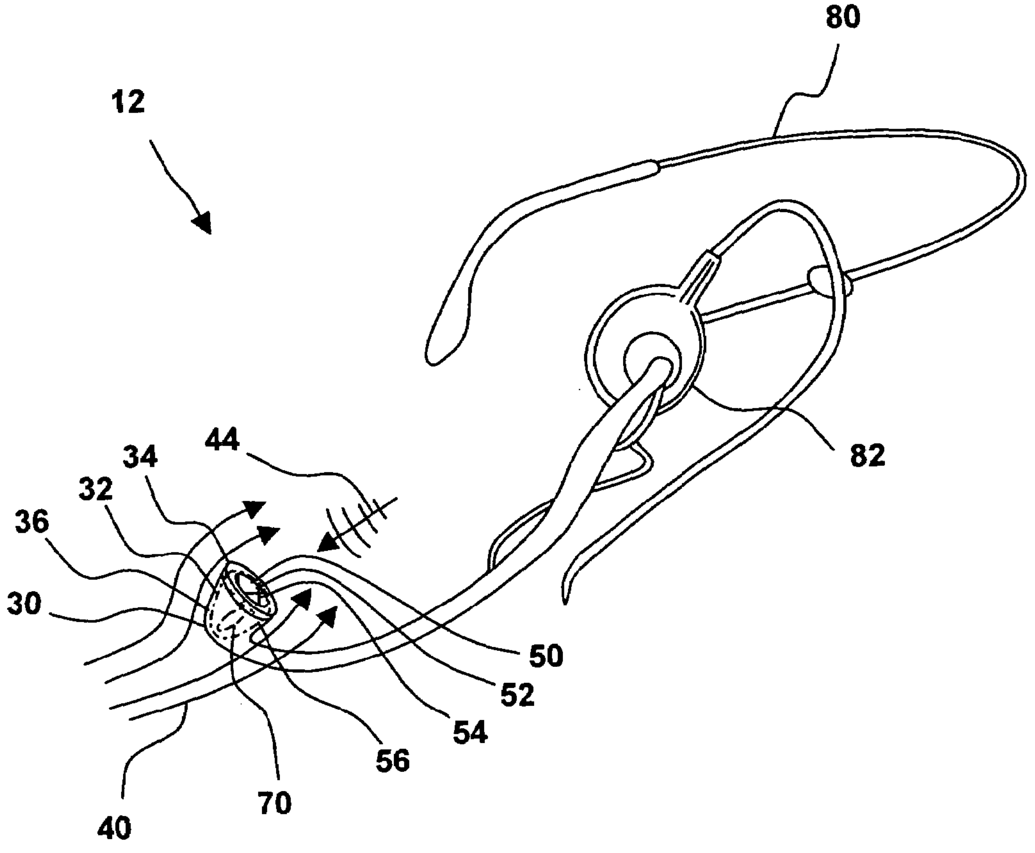
FIG. 4 illustrates a hands-free communication device, in accordance with one embodiment of the current invention.

FIG. 4 illustrates a hands-free communication device, in accordance with one embodiment of the present invention. A hands-free communication device 12 includes a headset 80 having at least one earphone 82 and a microphone 70. Device 12 includes a shell 30 having an airflow diverter 32 and a flow separation edge 34. Airflow diverter 32 with, for example, a contoured outer surface 36 partially surrounds microphone 70 to redirect a flow of air 40 away from microphone 70, the flow of air originating from, for example, an air conditioning system within a vehicle, an open window, or the air through which a rider travels on a bicycle, motorcycle or driver with a convertible top down. Flow separation edge 34 is positioned downstream of airflow diverter 32.

Device 12 includes an acoustic entry port 50 surrounded by or at least partially bordered by flow separation edge 34. Acoustic entry port 50, positioned downstream of flow of air 40, allows entry of acoustic sound 44 into microphone 70. Acoustic entry port 50 may include one or more apertures 52. A microphone grille 54 may be positioned in acoustic entry port 50.

Flow of air 40 separates from airflow diverter 32 or flow separation edge 34, minimizing pressure fluctuations experienced by microphone 70. For example, flow separation edge 34 generates recirculating flow near an acoustic entry port 50 of airflow guard 20 to reduce the level of pressure fluctuations as experienced by microphone 70. To further decrease effects of pressure fluctuations, acoustic foam 56 or other suitable damping material may be positioned within shell 30 to isolate microphone 70.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An airflow guard for a microphone, the airflow guard comprising:

a shell having a mating surface, an airflow diverter and a flow separation edge, said flow separation edge being positioned downstream of the airflow diverter, and said shell being adapted for installation in a vehicle such that said mating surface is positionable adjacent a vehicle surface with the microphone being located under said shell; and an acoustic entry port located in said shell between the flow separation edge and the mating surface and at least partially bordered by the flow separation edge to allow entry of acoustic sound into the microphone;

wherein the airflow diverter partially surrounds the microphone to redirect a flow of air away from the microphone, and wherein the flow of air separates from the flow separation edge to generate a recirculating flow downstream of the acoustic entry port to thereby reduce the level of pressure fluctuations in front of the microphone.

2. The airflow guard of claim 1, wherein pressure fluctuations experienced by the microphone from the flow of air are minimized.

3. The airflow guard of claim 1, wherein the airflow diverter includes a contoured outer surface to redirect the flow of air away from the microphone.

4. The airflow guard of claim 1, wherein the acoustic entry port comprises at least one aperture.

5. The airflow guard of claim 1, wherein the acoustic entry port is positioned downstream of the flow of air.

6. The airflow guard of claim 1 further comprising: a microphone grille positioned in the acoustic entry port.

7. The airflow guard of claim 1 further comprising: an acoustic foam positioned within the shell to isolate the microphone.

8. An acoustic reception system for a mobile vehicle, the system comprising:

a microphone connected to an in-vehicle communication device; and an airflow guard for the microphone including:

a shell having a mating surface, an airflow diverter and a flow separation edge, said flow separation edge being positioned downstream of the airflow diverter, and said shell being adapted for installation in a vehicle such that said mating surface is positionable adjacent a vehicle surface with the microphone being located under said shell; and an acoustic entry port located in said shell between the flow separation edge and the mating surface and at least partially bordered by the flow separation edge to allow entry of acoustic sound into the microphone;

wherein the airflow diverter partially surrounds the microphone to redirect a flow of air away from the microphone, and wherein the flow of air separates from the flow separation edge to generate a recirculating flow downstream of an acoustic entry port to thereby reduce the level of pressure fluctuations in front of the microphone.

9. The system of claim 8, wherein pressure fluctuations experienced by the microphone from the flow of air are minimized.

10. The system of claim 8, wherein the in-vehicle communication device includes one of a cell phone, a telematics unit, an entertainment system, or a voice-recognition system.

11. The system of claim 8, wherein the microphone and the shell are connected to one of a group consisting of a rearview mirror, a steering wheel, a steering column, a dash, an entertainment console, an overhead console, a vehicle ceiling, and an in-vehicle location.

12. The system of claim 8 further comprising: a microphone grille positioned in the acoustic entry port.

13. The system of claim 8 further comprising: an acoustic foam positioned within the shell to isolate the microphone.

* * * * *